United States Patent
Minear et al.

(10) Patent No.: US 7,536,172 B2
(45) Date of Patent: May 19, 2009

(54) TEST ENABLED APPLICATION EXECUTION

(75) Inventors: Brian Minear, San Diego, CA (US); Mazen Chmaytelli, San Diego, CA (US); Mitchell B. Oliver, San Diego, CA (US); Laurence Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 11/466,036

(22) Filed: Aug. 21, 2006

(65) Prior Publication Data

US 2006/0281440 A1 Dec. 14, 2006

Related U.S. Application Data

(63) Continuation of application No. 10/222,705, filed on Aug. 15, 2002, now Pat. No. 7,096,004.

(60) Provisional application No. 60/312,675, filed on Aug. 15, 2001.

(51) Int. Cl.
*H04M 1/66* (2006.01)
(52) U.S. Cl. .......................... 455/410; 705/59
(58) Field of Classification Search ............. 455/410, 455/67.1; 705/59
See application file for complete search history.

(56) References Cited

U.S. PATENT DOCUMENTS

| | | | |
|---|---|---|---|
| 4,919,545 A | 4/1990 | Yu | |
| 5,297,193 A | 3/1994 | Bouix et al. | |
| 5,509,073 A | 4/1996 | Monnin | |
| 5,764,726 A | 6/1998 | Selig et al. | |
| 5,862,474 A | 1/1999 | Kimball | |
| 5,953,654 A | 9/1999 | Li | |
| 5,987,134 A | 11/1999 | Shin et al. | |
| 5,987,306 A | 11/1999 | Nilsen et al. | |
| 6,052,600 A | 4/2000 | Fette et al. | |
| 6,061,346 A | 5/2000 | Nordman | |
| 6,158,010 A | 12/2000 | Moriconi et al. | |
| 6,263,434 B1 | 7/2001 | Hanna et al. | |

(Continued)

FOREIGN PATENT DOCUMENTS

EP 0967765 12/1999

OTHER PUBLICATIONS

International Search Report - PCT02/US026034, International Search Authority - United States Patent Office - Mar. 20, 2003.

*Primary Examiner*—William D Cumming
(74) *Attorney, Agent, or Firm*—Fariba Yadegar-Bandari; Robert J. O'Connell

(57) ABSTRACT

A method for executing an application on a wireless device is provided. The method includes receiving, at the wireless device, a test permission that indicates the wireless device is authorized to execute the application on a wireless network in a testing capacity. The test permission is associated with the wireless device. The method further includes requesting the execution of the application on the wireless device and evaluating whether the wireless device includes the test permission. If the wireless device includes the test permission, the method further includes executing the application on the wireless device. The application is executed on the wireless device even if the application includes other permissions necessary to execute the application on the wireless device or the wireless network.

21 Claims, 10 Drawing Sheets

U.S. PATENT DOCUMENTS

| | | |
|---|---|---|
| 6,339,826 B2 | 1/2002 | Hayes, Jr. et al. |
| 6,411,941 B1 | 6/2002 | Mullor et al. |
| 6,463,534 B1 | 10/2002 | Geiger et al. |
| 6,480,962 B1 | 11/2002 | Touboul |
| 6,519,470 B1 | 2/2003 | Rydbeck |
| 6,609,199 B1 | 8/2003 | DeTreville |
| 6,675,201 B1 | 1/2004 | Parkkinen |
| 6,728,536 B1 | 4/2004 | Basilier et al. |
| 6,775,536 B1 | 8/2004 | Geiger et al. |
| 7,096,004 B2 * | 8/2006 | Minear et al. ............... 455/410 |
| 2002/0107809 A1 * | 8/2002 | Biddle et al. .................. 705/59 |
| 2006/0281440 A1 * | 12/2006 | Minear et al. ............... 455/410 |

* cited by examiner

TEST ENABLED APPLICATION EXECUTION

CROSS-REFERENCE TO RELATED APPLICATION

This application is a Continuation of co-pending U.S. patent application Ser. No. 10/222,705, filed Aug. 15, 2002, entitled Test Enabled Application Execution, which application is incorporated herein by reference in its entirety.

I. FIELD OF THE INVENTION

The present invention relates to processing of applications for use in a wireless device, and more particularly, to increasing the security, safety and integrity of applications executed on a wireless device.

II. BACKGROUND

Wireless communication has experienced explosive growth in recent years. As consumers and businesses rely more on their wireless devices, such as mobile phones and personal digital assistants (PDAs), wireless service providers, i.e., carriers, strive to provide additional functionality on these wireless devices. This additional functionality would not only increase the demand for wireless devices but also increase the usage among current users. Increasing functionality, specifically by increasing the applications accessible by the wireless device, however, is costly and complicated thereby discouraging carriers from providing this functionality.

Furthermore, there is little to no assurance that an application, once placed on a wireless device, will execute properly. Currently, reliance on the application's ability to execute on a wireless device rest on the developer, the wireless device maker and/or the carrier. As more applications are developed and the number of applications on a wireless device increases, the wireless device environment becomes more dynamic. For example, a wireless device may choose to retrieve or execute a number of different applications from large pool of available applications at any given time. Thus, ensuring that any given application will be distributed to the wireless device and execute safely becomes much more difficult to control.

This is of particular concern because improper execution of an application may not only detrimentally affect the wireless device, it may also be harmful to the carrier network and other network components, including other wireless devices. For example, one application, if not restricted, could take control of a wireless device's power control and cause interference among other wireless devices and decrease the overall capacity in the cell servicing the wireless device.

Currently, neither wireless device manufacturers nor carriers are equipped to handle the testing and safe distribution of applications in a dynamic application distribution and execution environment. Thus, there is a concern that applications will be distributed and executed on wireless devices that may cause harm to the wireless device, network or other wireless devices on the network.

In addition, other safety issues arise as more applications are developed and the environment by which applications are transmitted to a wireless device becomes more dynamic. As the number of applications and the number of developers creating these applications increases, the desire to know the source of any given application, i.e., the developer, also increases. A carrier or a handset manufacturer will want to know, with some degree of reliability, that they can determine the source of an application.

Consequently, what is needed in the art is a system and method for providing a safer environment for the distribution and execution of applications on a wireless device.

SUMMARY OF THE INVENTION

Systems and methods consistent with the present invention overcome the shortcomings of existing systems by allowing application independent permission for testing on a device.

In one embodiment, a method for executing an application on a wireless device, comprises receiving a permission associated with the wireless device, requesting the execution of the application on the wireless device, evaluating the permission associated with the wireless device using a rule stored in the wireless device and executing the application in the event the evaluation of the permission and the rule indicate the application is allowed to execute. The method may further comprise requesting the execution of a second application on the wireless device, and executing a second application in response to a second evaluation of the permission and the rule indicating the second application is allowed to execute.

In another embodiment of the present invention, a method for accessing applications on a wireless device comprises requesting an application independent permission for the wireless device, receiving the application independent permission, initiating the access of a first application on the wireless device, evaluating the first application independent permission on the wireless device, and accessing the first application in the event the evaluation of the application independent permission indicates access is allowed.

In yet another embodiment of the invention, a wireless device comprises an input to receive an application independent permission, a storage to store the application independent permission and a unique identifier associated with the wireless device, and a control program configured to determine access to an application by evaluating the application independent permission and the unique identifier.

In yet another embodiment of the invention, a method of managing testing on a device comprises receiving profile information of a testing entity, evaluating the profile information of the testing entity, sending a testing key associated with the device, and tracking the distribution of the testing key. The testing key may be a test enabled permission. The method may further comprise assigning an expiration period associated with the testing key, where upon the testing key becomes invalid at the end of the expiration period. The method may also comprise testing a plurality of applications on the device, wherein the testing of the plurality of applications includes an evaluation of the testing key prior to executing each of the plurality of applications.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE PREFERRED EMBODIMENT

Figure 1:
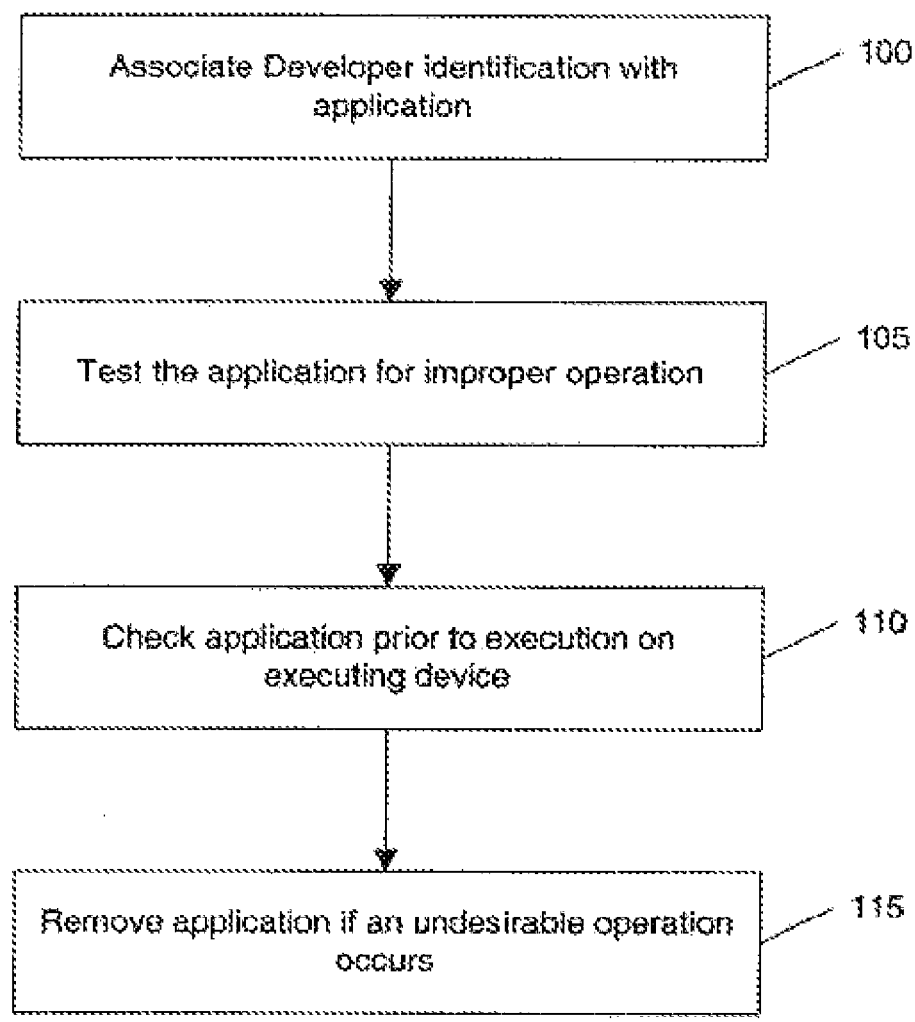
FIG. 1 is a flowchart depicting the high-level process of safe application distribution and execution in an exemplary embodiment of the present invention.

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

Introduction

The present invention provides safe and secure application distribution and execution by providing systems and methods that test an application to ensure that it satisfies requirements for the environment in which it will execute. Furthermore, by using rules and permission lists, application removal, and a modification detection technique, such as digital signatures, the present invention provides mechanisms to safely distribute and execute a tested, or untested, application by determining whether the application has been modified, determining if it has permission to execute in a given wireless device environment, and removing the application should it be desirable to do so.

It will be recognized to those skilled in the art that the forgoing describes an application file type being distributed and executed for simplicity of description. An "application" may also include files having executable content, such as: object code, scripts, java file, a bookmark file (or PQA files), WML scripts, byte code, and perl scripts. In addition, an "application" referred to herein, may also include files that are not executable in nature, such as documents that may need to be opened or other data files that need to be accessed.

FIG. 1 is a flowchart depicting the high level process of safe application distribution and execution in a manner consistent with an exemplary embodiment of the present invention. An embodiment of the present invention enables a developer identification to be associated with the application, performs testing on the application for the environment where the application is intended to execute, assigns permissions that can be used to dictate which devices or systems may execute the application, and provides for application removal should an application perform illegal or undesirable actions.

It is preferable that systems and methods employ all these techniques to increase the safe distribution and execution of an application. It will be recognized, however, that even employing one or more of these techniques will increase the safe distribution and execution of an application.

The high level process begins by associating the developer identification with an application (Step 100). This process may be performed by binding the developer identification with the application as it is distributed. Alternatively, the associated developer identification may be stored along with the corresponding application on a server in the system. It is also preferable that the developer identification information be stored and associated with the application information so that it cannot be easily modified.

The application is then tested for improper operation (Step 105). The application may be used in an environment where improper operation may not only affect the device on which the application is running, but also those other devices that are connected or networked with that device. It is preferable to test the application so that it does not make improper system calls or negatively affect the device or other connected devices during its operation. In one embodiment, this testing is performed by a certification process where the application is tested to determine if it meets predetermined criteria. It is preferable also, to have a certification process, independent of the developer, to test the application. The independence of the certification process encourages more accurate and reliable testing.

Prior to executing the application, the application is checked to determine if it is "allowed" to execute on the device (Step 110). This check may be performed by the use of permissions and rules, described below, or by other permission mechanisms known to those skilled in the art. Furthermore, it is preferable that the application be checked prior to every attempt to execute the application. This persistent checking process increases the safety of the application's execution. For example, it guards against an application having a Trojan horse that may have been inserted into that application on the executing device via another application.

An application that performs an improper or undesirable operation is then removed from the device (Step 115). This prevents the application from doing any further damage and also frees up the memory in the device for other uses. Alternatively, the application does not need to be removed from the wireless device. Removing an application may refer to the disabling of the application and leaving the application on the device.

Figure 2:
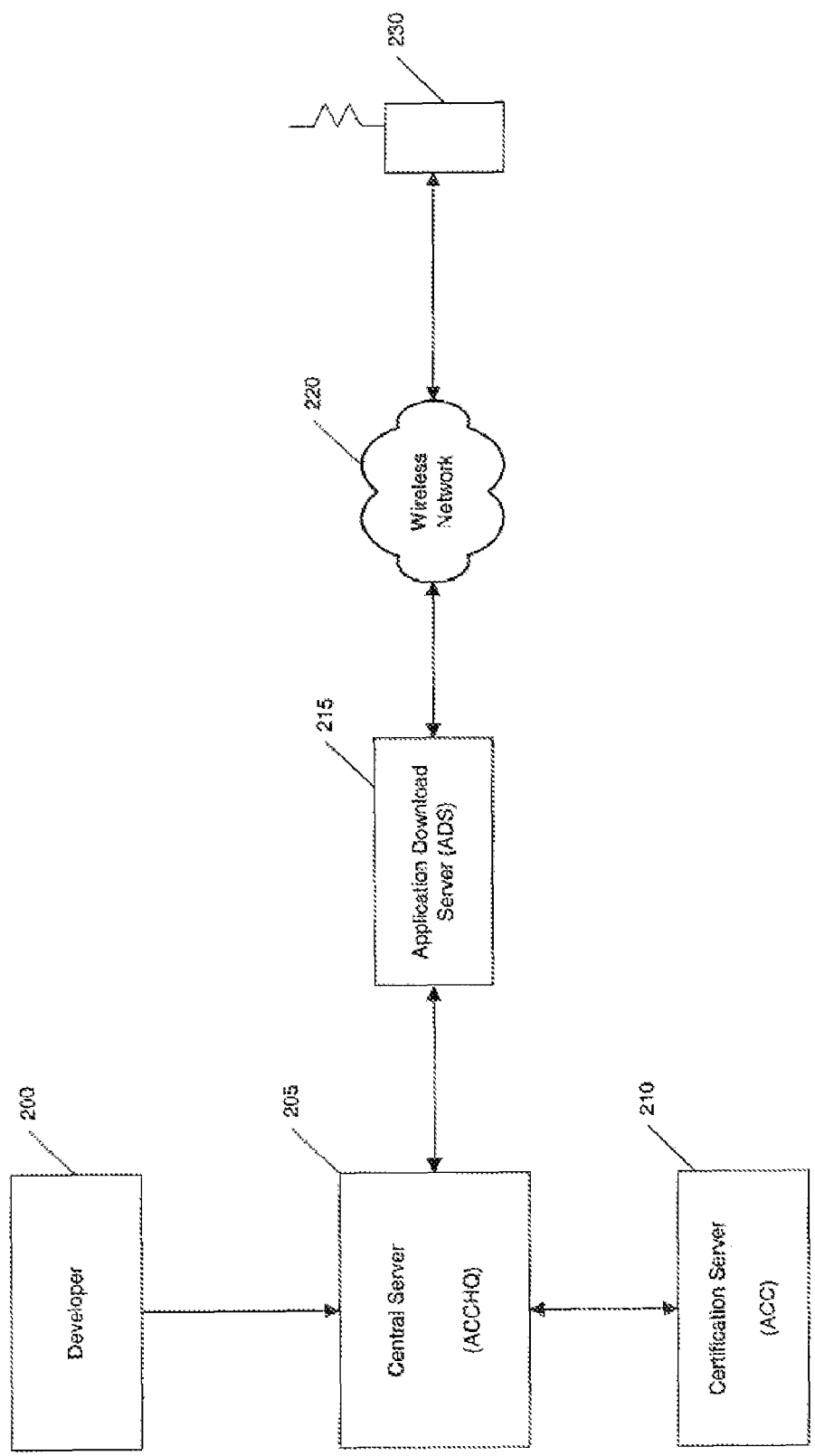
FIG. 2 is a block diagram depicting a system architecture in which an exemplary embodiment of the present invention may be practice.

FIG. 2 depicts a system architecture in which an exemplary embodiment of the present invention may be practiced. A developer 200 creates an application for use on the wireless device 230. As described above, it will be recognized by those skilled in the art that, while the foregoing description includes an application file type, other file types may be used.

Furthermore, it will be recognized by those skilled in the art that the present invention may be used with other wireless or non-wireless devices and may employ wireless and non-wireless networks or a combination thereof.

Typically, the developer 200 will have a set of specifications for which to develop the application to execute on the wireless device 230. In one embodiment, the wireless device includes a software platform to assist the application's interface with the wireless device, such as the BREW™ software developed by QUALCOMM, Incorporated, headquartered in San Diego, Calif. The developer may create the application satisfying the software platform, or BREW™ software, defined standards and conventions.

The developer 200 is connected to a central server 205, in one embodiment, so that it may electronically transmit the application to the central server 205. In one embodiment, the central server is an Application Control Center Headquarters (ACCHQ) server used in the distribution of applications to wireless devices. The developer 200 may digitally sign the application (discussed further below) to determine if the application was modified. It will be recognized that a physical connection to the central server is not necessary. For example the developer 200 may send, such as via first class mail, the application to the central server 205 stored on a CD-ROM.

In addition, the developer sends various source identification information to the central server 205. This source identification information may include any type of information that may be associated with the application that identifies the developer, such as a company name, tax identification of the company, or other identifying information.

The central server 205, either by itself or using a certification server 210, is used in the analysis and certification of applications. In one embodiment, the certification server is an Application Control Center (ACC). In one embodiment, the certification server 210 analyzes the application to determine whether the application satisfies previously defined certification criteria that the developer could use as guidance in developing the application. The certification criteria can be any criteria that an application must satisfy prior to execution on a wireless device. Such criteria may include verifying: (a) that the application functions as claimed by the developer, so that the application does not harm the wireless device's operation (e.g., it does not crash the phone); (b) that the application does not access data or memory that it should not (e.g., it doesn't access data or files owned by other applications, the operating system or platform software); and (c) that it does not negatively impact the wireless devices resources, such as detrimentally monopolizing the input and output of the wireless device.

The central server 205 may also assign a set of permissions associated with the application. This permission list is determined by various factors, including an analysis of whether the wireless device passes the certification process, what networks 220 the application is approved to execute on and whether the wireless device supports the application. There may be many factors used to determine a permission list and is left to those skilled in the art when implementing the present invention.

The central server 205 receives the developer identification information and correlates it with the application created by the developer 200. Should any problems exist with the application, the central server will be able to identify the source of the application. In one embodiment, the developer information is passed to the wireless device 230 so that the correlation may be performed by the wireless device or other systems connected to the wireless device.

In one embodiment, the central server is also connected to an application download server (ADS) 215. The application download server 215 is used to interface with a wireless device via a wireless network 220 to download an application. The central server may also send the permissions list and developer identification associated with the application to the ADS where it can be stored until transmission to a wireless device. It is preferred that the application, permission list and the developer identification be digitally signed by the central server to increase security from modification.

It will be recognized by those skilled in the art that an ADS may be used to connect to multiple networks 220 for distribution of applications, files and other information to the various wireless devices 230. Furthermore, the wireless and non-wireless networks may be employed to transmit the application's permission list and developer identification to the wireless device.

In response to a request for an application, the ADS 215 will send the application, permission list, developer identification, and digital signature(s) to the wireless device 230 via the network 220. In one embodiment, the wireless device 230 will contain a key to check the digital signature in order to determine if application, permission list and/or developer information is modified.

It is preferred, if digital signatures are employed in the present invention, that the central server use a secure key to create the digital signature and install a key on a wireless device to evaluate the digital signature. By using a secure key, the wireless device will have a higher degree of reliability that the digital signature was created by the central server and not an imposter.

Should the application cause any errors on the wireless device, or for any other desired reason, the wireless device may initiate the removal of the application. Furthermore, an application may be removed from the wireless device based on a request from the ADS or central server. This application removal process further protects the wireless device environment from repeated execution of corrupted and/or destructive applications.

Figure 3:
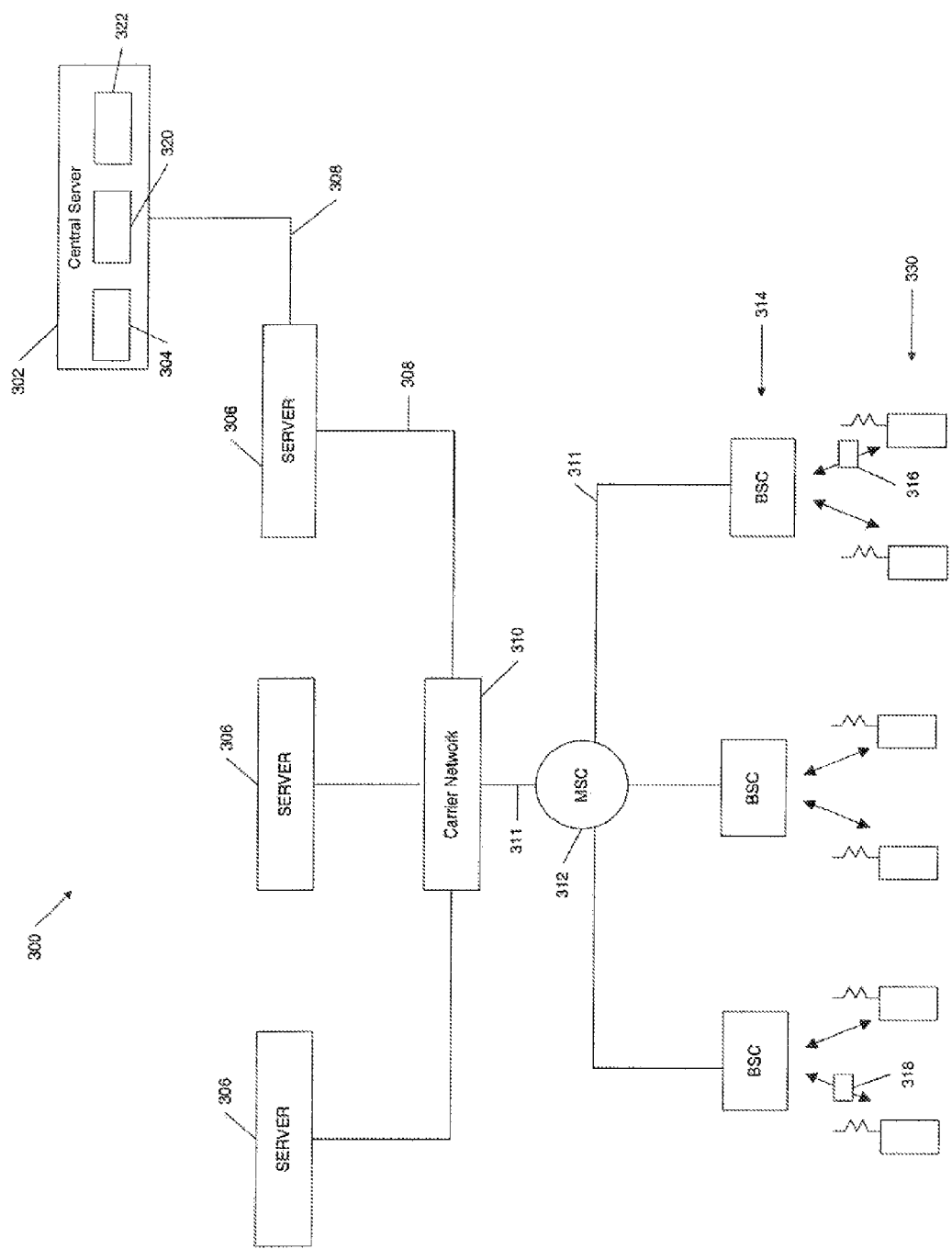
FIG. 3 is a block diagram depicting a wireless network architecture in which a safe application distribution processing system may be practiced in an exemplary embodiment of the present invention.

FIG. 3 depicts a wireless network architecture in which an application distribution system may be practiced in an exemplary embodiment of the present invention. A central server 302 is an entity that certifies, either by itself or in combination with a certification server, the application programs as compatible with a defined set of programming standards or conventions. As described earlier, these programming standards may be established so that the application will execute on a BREW™ software platform, such as the BREW™ platform.

In one embodiment, the central server database 304 consists of a record of the identifications for each application program downloaded at any time onto each wireless device 330 in the network 300, an Electronic Service Number ("ESN") for the individual who downloaded the application program, and a Mobile Identification Number ("MIN") unique to the wireless device 330 carrying that application program. Alternatively, the central server database 304 contains records for each wireless device 330 in the network 300 of the wireless device model, wireless network carrier, the region where the wireless device 330 is used, and any other information useful to identify which wireless device 330 are carrying which application programs. In addition, the central server database may also store this developer identifying information associated with an application.

The central server 302 may also include a remove command source 322. The remove command source 322 is the person(s) or entity(ies) that makes the decision to remove one or more targeted application programs. The remove command source 322 also is the entity that constructs a remove command 316 (discussed below) that is broadcast to identified wireless device 330 carrying the targeted application program(s). Alternatively, and without limitation, the remove command source 322 may be one or more persons or entities involved with the development and issuance of the targeted application program, persons or entities involved with the manufacturing of the wireless device 330, and/or persons or entities involved with the function of any part of the network 300.

The central server 302 communicates with one or more computer servers 306, e.g., an ADS, over a network 308, such as the Internet (preferably secured). The servers 306 also communicate with a carrier network 310 via a network 308. The carrier network 310 communicates with the MSC 312 by both the Internet and POTS (plain ordinary telephone system) (collectively identified in FIG. 3 as 311). The Internet connection 311 between the carrier network 310 and the MSC 312 transfers data, and the POTS 311 transfers voice information. The MSC 312, in turn, is connected to multiple base stations ("BTS") 314. The MSC 312 is connected to the BTS by both the Internet 311 (for data transfer) and POTS 311 (for voice information). The BTS 314 sends messages wirelessly to the wireless devices 330 by short messaging service ("SMS"), or any other over-the-air method.

One example of a message sent by the BTS 314 in the present invention is a remove command 316. As further discussed herein, the wireless device 330, in response to receiving a remove command 316, responds by uninstalling a targeted application program 109 stored on the wireless device 330. The remove command 316 is constructed by the remove command source 322 (which may or may not be the same person(s) or entity(ies) that made the decision to initiate a remove of the targeted application program 109). The remove command 316 is sent by the remove command source 322 over the network 300 for broadcasting to the wireless devices 330.

Another example of a message broadcast by the BTS 314 is a remove message 318. As further discussed herein, a remove message 316 is a message that is broadcast to a wireless device 330 carrying the targeted application program and an instruction to uninstall the targeted application program. In response to the remove message 316, the wireless device 330 automatically communicates with a remove message source 320. The remove message source 320 sends the wireless device 330 information about the identity of the targeted application program. In response to receiving this information, the wireless device 330 uninstalls the targeted application program.

The remove message source 320 may be the same entity as the central server 302. Alternatively, and without limitation, the remove message source 320 may be one or more persons or entities involved with the development and issuance of the targeted application program 109, persons or entities involved with the manufacturer of the wireless device 330, and/or persons or entities involved with the function of any part of the network 300.

Similarly, the above network may be used to send the application, permission list and associated digital signatures from the central server to various servers 306 (e.g., ADS') through the MSC and BTS to the wireless devices 330.

By using the remove message as described in the above embodiment, the safety of application distribution and execution is increased by providing a mechanism to uninstall corrupted or undesirable applications. It will be recognized by those skilled in the art that, while the preceding described a remove command initiated by the central server, the wireless device may also initiate the removal or uninstallation of the application and its related information.

Figure 4:
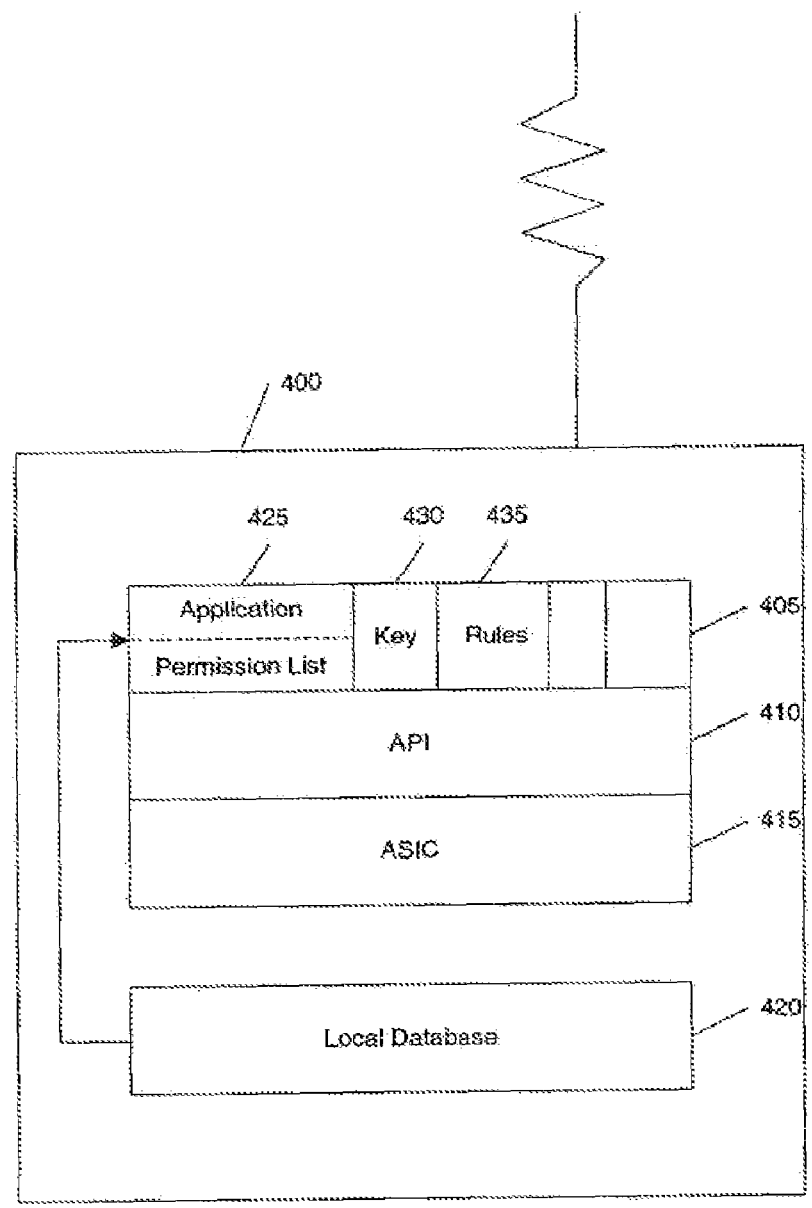
FIG. 4 is a block diagram depicting a wireless device and some internal components in an exemplary embodiment of the present invention.

FIG. 4 depicts a wireless device and some internal components in an exemplary embodiment of the present invention. While this embodiment is directed to a wireless device 400, it is used as an example without any intended limitation. The invention could alternatively be performed on any form of remote module capable of communicating through a network, including, without limitation, wireless and non-wireless devices, such as personal digital assistants ("PDAs"), wireless modems, PCMCIA cards, access terminals, personal computers, devices without a display or keypad, or any combination or sub-combination thereof. These examples of remote modules also may have a user interface, such as a keypad, visual display or sound display.

The wireless device 400 shown in FIG. 4 has an application-specific integrated circuit ("ASIC") 415 installed at the time the wireless device 400 is manufactured. The ASIC is a hardware component that is driven by software included in the ASIC. An application programming interface ("API") 410 also is installed in the wireless device 400 at the time of manufacture. In one embodiment, the API represents a BREW API or software platform. The API 410 is a software program configured to interact with the ASIC. The API 410 serves as an interface between the ASIC 415 hardware and application programs (discussed below) installed on the wireless device 400. Alternatively, the wireless device 400 may contain any other form of circuitry that would allow programs to be operated in a manner that is compatible with the hardware configuration of the wireless device 400. The wireless device 400 also has storage 405.

The storage 405 consists of RAM and ROM, but, alternatively, could be any form of memory, such as EPROM, EEPROM or flash card inserts.

The storage area 405 of the wireless device may be used to store received applications and permission lists 425. In addition, the storage area 405 may be used to store one or more "keys" 405. These keys can be applied to a digital signature using a signature algorithm to determine whether the signed information was modified.

Rules 435 may also be installed on the wireless device 400. These rules may be used in conjunction with the permission list to determine if an application is allowed to execute. For example, a rule may state that an application is allowed to execute if a certification flag is set in the permission list (i.e., indicating the application passed certification). The permission list will have the certification flag set or not, depending on whether it passed certification. By applying the rule to the information contained in the permission list, permission to execute the application is either granted or denied.

The manufacturer (not shown) of the wireless device 400 downloads application programs onto the storage 405 of the wireless device 400 at the time the wireless device 400 is manufactured. These application programs may be any program potentially useful or entertaining to the user of the wireless device, such as games, book, or any other type of data or software programs. The application programs also may be downloaded onto the wireless device 400 over the air after the wireless device is manufactured.

The manufacturer may also download a remove program (not shown) onto the storage 405 of the wireless device 400 at the time the wireless device 400 is manufactured. The remove program also may be installed over the air after the wireless device 400 is manufactured.

The remove program, when executed by the wireless device 400, uninstalls one or more targeted application programs from one of the applications stored on the wireless device 400. The targeted application program is an application program that needs to be uninstalled from the wireless device 400 for various reasons discussed below. The remove program may additionally or alternatively be programmed to disable the targeted application program or reprogram it to perform differently.

The wireless device 400 has a local database 420 installed by the manufacturer. The API of the wireless device is programmed to automatically update the local database 420 with a record of identifying information about each of the application programs stored on the wireless device 400. The local database 420 contains a record of the signature identifications unique to each application program stored on the wireless device 402. Additionally, the local database 420 may contain a record of the location of the application programs within the storage 405 on the wireless device 400 and any other information useful for keeping track of which application programs are downloaded on the wireless device 400, and where they are located.

Figure 5:
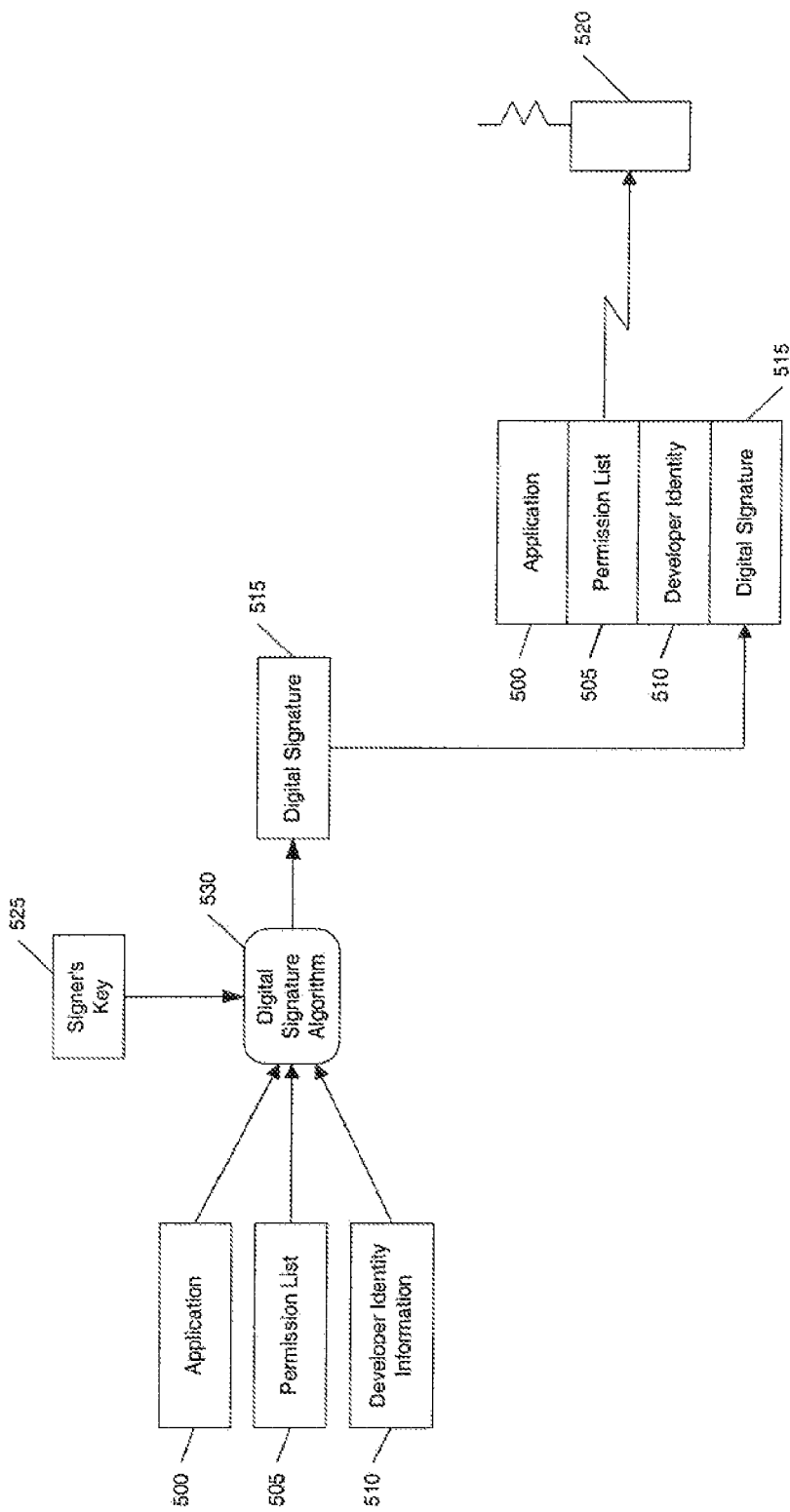
FIG. 5 is a block diagram depicting information used to create a digital signature and transmitted to a wireless device in an exemplary embodiment of the present invention.

FIG. 5 is a block diagram depicting information used to create a digital signature and transmitted to a wireless device in an exemplary embodiment of the present invention. As is known by those skilled in the art, digital signatures may be used to track whether a digital file has been modified. As described, digital signatures can be applied to any digital file, including documents, applications, databases, etc. In general, a digital signature is created by applying a key to a file using a signature algorithm. This digital signature is created using the information contained in the file. Typically, the digital signature is sent along with the file to a recipient. The recipient of the file and digital signature can then apply a key to the received file and digital signature to determine if the file has been modified during the transmission to the recipient.

Keys used to create and evaluate a digital signature can be used to determine the identity of the signer. For example, a key may be generated to create a digital signature by an entity and kept securely. This entity can distribute a corresponding key that can be used to evaluate the digital signature. If the key is kept securely and not compromised, the recipient evaluating the digital signature can determine not only whether the information was modified, but also the identity of the signer.

Alternatively, third-party entities can create keys for specific entities in a secure fashion. Therefore, a recipient having a key associated with a specific identity will be able to determine if that entity was the signer.

In one embodiment of the present invention, a digital signature 515 is generated by using the signer's key 525, e.g., the central server's key in FIG. 2, the application 500, the permission list 505 and the developer identity information 510 as input to a digital signature algorithm 530. The result is a digital signature 515 that is dependent on the information contained in the inputs.

After creating the digital signature 515, the application 500, permission list 505, developer identity information 510 and digital signature 515 are transmitted to the wireless device 520. The wireless device can then use the digital signature to determine if any of the application or related information (i.e., the permission list and developer identity information) was modified. In addition, using one of the techniques described above, such as a secure key, the wireless device may also have confidence in the identity of the signer who transmitted this information to the wireless device.

Figure 6:
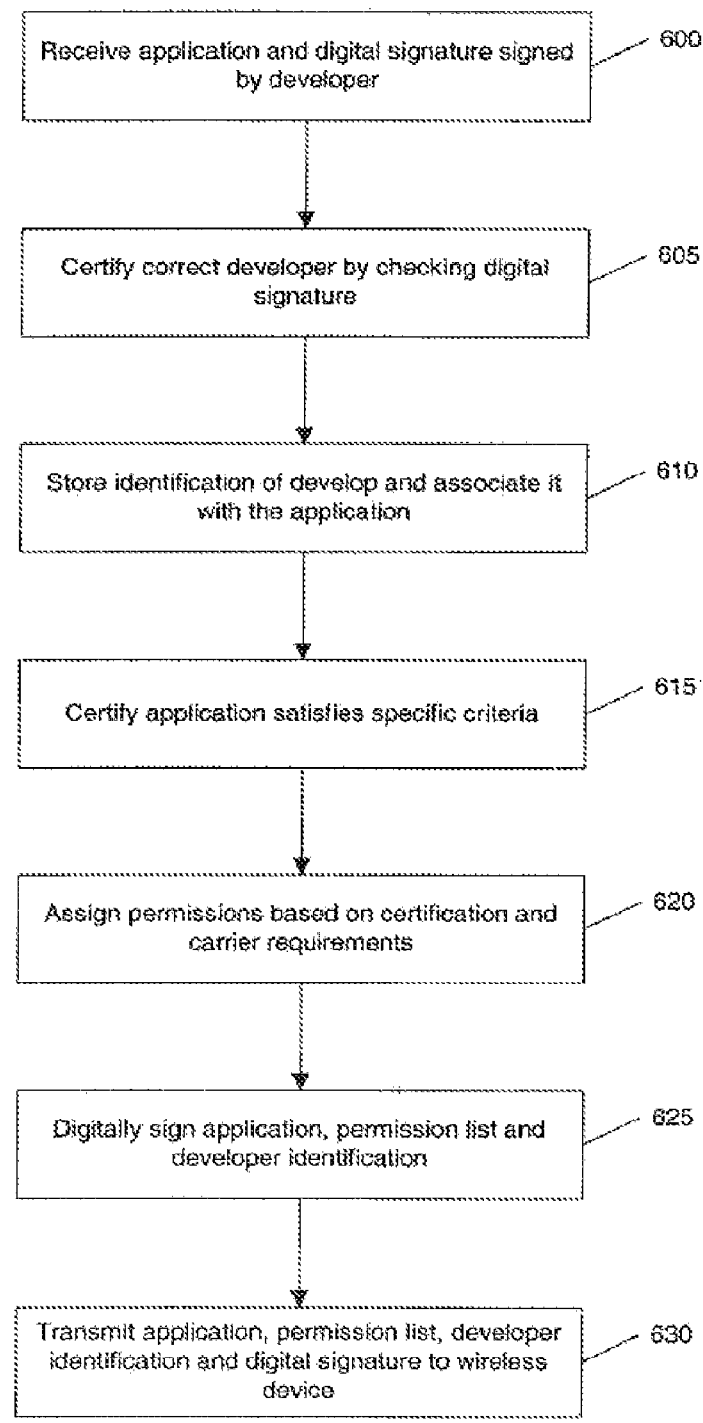
FIG. 6 is a flowchart depicting the steps used to by a server or severs in distributing an application in an exemplary embodiment of the present invention.

FIG. 6 is a flowchart depicting the steps used to by a server or servers in distributing an application in a manner consistent with an exemplary embodiment of the present invention. In this exemplary embodiment, the process begins by receiving an application and a digital signature (Step 600). The digital signature is information related to the application such that it can be determined if the application was modified prior to its reception. Furthermore, it is preferable that the key used to sign the digital signature be assigned by a third party in order validate that the entity or developer signing the application is the developer that received the assigned key.

After receiving the application and digital signature, the digital signature is evaluated to determine if the develop who sent the application is the same as the one who signed the application (Step 605). If a third party assigned the key to the developer to create the digital signature, then the third party may also assign the key to evaluate the digital signature to the receiving party, such as to the central server described with respect to FIG. 2.

The identification of the developer, or whichever entity signed and/or created the application, is then stored and associated with the application (Step 610). The storage may be in a table, database or in some other manner such that it can be later retrieved in the event the identity of the developer needs to be determined. In one embodiment, the storage of the developer's identification is stored in a wireless device and not in a server.

The received application is then certified to determine if it meets specified criteria (Step 615). In one embodiment, an application may be written to execute on a specific platform, such as the BREW™ platform developed by QUALCOMM, Incorporated, headquartered in San Diego, Calif. used in wireless devices. A specific platform, or device, may have specific requirements that an application must meet prior to having it executed on the device. For example, a platform or device may require that an application not access specific memory locations in the device so that the integrity of the device or other applications located in memory are not compromised. These criteria can be specified and the application can be tested to determine if these criteria are met.

After certification, the permissions associated with the application for a given environment are assigned (Step 620). Permission may be assigned based on many factors, depending on the environment in which the present invention is implemented. In one embodiment, the applications are intended for a wireless device. In this embodiment, assigning permissions may depend on the carrier network, a wireless device's requirements, results of certification testing, and developer, carrier or other testing environments, for example. Therefore, an example of a permission list may be to indicate that the application passed certification testing and that it may be on a specific carrier's network.

The server then digitally signs the application, permission list, and developer identification (Step 625). In one embodiment, this signature is performed using a secure key so that the identity of the server can be determined by those receiving this digitally signed information. It is not required that the developer's signature that was received by the server also be signed or that the developer's signature be sent to the wireless device.

The application, permission list, developer identification and the signature created in step 625 is then transmitted to a wireless device (Step 630).

Figure 7:
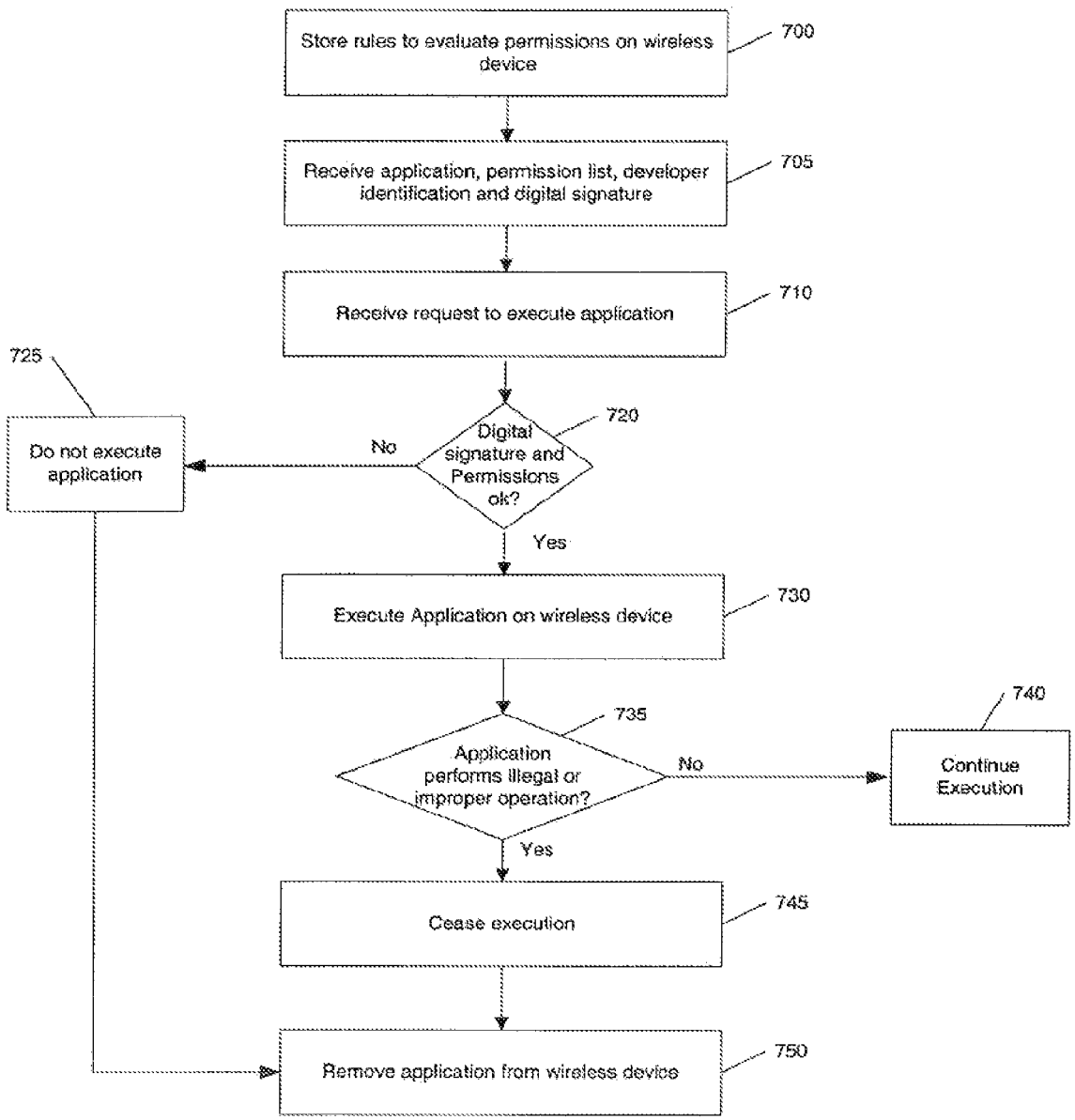
FIG. 7 is a flowchart depicting the steps used by a wireless device when executing an application in an exemplary embodiment of the present invention.

FIG. 7 is a flowchart depicting the steps used by a wireless device when executing an application in a manner consistent with an exemplary embodiment of the present invention. In this embodiment, the wireless device stores rules to evaluate permissions associated with an application (Step 700). It will be recognized by those skilled in the art that, while the present invention describes a rules/permissions paradigm, there are many paradigms that may be used to grant permission to an application for a specific device or platform and these are considered within the scope of the present invention.

The wireless device then receives the application, permission list, developer identification and digital signature (Step 705). In one embodiment, the wireless device may evaluate the received digital signature to determine the identity of the signer. The digital signature may also be used to determine if the application, permission list or developer identification was modified after having been signed.

The wireless device then receives a request to execute the application (Step 710). This request may come from the user of the wireless device wanting to execute a program. Alternatively, the request may be made by the wireless device itself or from some request transmitted to the wireless device, either through a network or direct connection to the wireless device.

After receiving the request, the wireless device evaluates the digital signature and the permission list associated with the application prior to executing the program (Step 720). As described, the wireless device, in one embodiment, may use rules to evaluate the permissions list. If by evaluating the digital signature it is determined that the application, permission list or developer identification was not modified, then the wireless device evaluates the permission list using the stored rules. If there was no modification and the evaluation of the rules against the permission list indicates that the application is granted permission to execute in the wireless device, the processing proceeds to execute the application on the device (Step 730).

If the evaluation in Step 720 indicates that either the application, permission list or developer identification was modified after being signed, or that the application is denied permission to execute on the wireless device, then the application is not executed (Step 725). Processing proceeds to remove the application from the wireless device (Step 750). It is also preferred that the permission list and developer identification also be removed from the wireless device.

Following step 730, the application's execution is monitored to determine if it performs an illegal or improper operation (Step 735). The wireless device or the platform the wireless device is using may define certain operations to be illegal or improper. These operations may include those that access restricted areas of memory or memory locations used by other programs or files. In addition, these operations may involve harmful uses of the wireless device's resources such that they may not only affect the wireless device, but other devices on the network the wireless device is attached.

If such an illegal or improper operation is attempted, then the application's execution is stopped (Step 745) and removed from the wireless device (Step 750) along with, preferably, the developer identification and permission list. As stated above, alternatively, the remove process may involve the disabling of the application, thereby preventing its execution, and keeping the application on the wireless device.

If no illegal, improper, or undesirable operation is performed in step 735, then the application is allowed to continue execution (Step 740).

Test, Enabled Permission

Applications may execute on a wireless device. Systems and methods, including those disclosed herein, describe a mechanism for the safe download of these applications to a wireless device. When the typical user uses the application, a control program may be included on the wireless device to evaluate the permissions and the rules on a wireless device to determine whether to execute an application. This "rule and permission" paradigm provide one mechanism to increase the safe execution by restricting those applications that don't have the permission to execute on the handset The control program function may be incorporated in an operating system, chip logic, or may be a separate program, such as the BREW™ API software developed by QUALCOMM.

When the application is being created, it will be understood why carriers do not want applications tested on their networks by anyone and everyone who is developing an application to execute on a handset using the carrier's network (e.g., the carrier may be concerned that the application may harm the network). The difficulty, however, is that a developer would like to test the application on a live network to complete testing but may not get permission to execute this application.

Consequently, it will be beneficial to aid the development environment to create systems and methods to ease the development of an application while still affording the developer the opportunity to execute on a wireless device.

To aid the development of applications, one embodiment of the present invention implements a rule/permission scheme that evaluates whether the wireless device is part of a development effort and grants the permission to execute the application (or access the document) based on the wireless device on which the permission is located. For example, designating a wireless device as a test wireless device, e.g., providing a "test enabled", i.e., a test enabling, permission to the wireless device and allowing applications to execute on the test wireless device.

Systems and methods consistent with the present invention also provide a server, that may be accessible via a website, that manages all the wireless devices designated as test enabled. The server may have a management function which includes having a profile for a developer requesting a test enabled permission, such a profile may include identification information about the developer, as well as how many wireless devices on a specific network that the developer may be allowed to have a test enabled permission for. It will be recognized that the wireless device may be associated with a carrier. The carrier may dictate how many wireless devices, in total and per developer, they will allow to be designated as test enabled. Keeping track of this information may also be included in the management function.

The management function may also include tracking an expiration date for each of the test enabled permissions. If the server provides an expiration date, the test enabled permission may terminate on the wireless device once the expiration date has passed. Furthermore, the management function may track all outstanding wireless devices having the test enabled signature and the expiration date for each one.

The management function allows the control of risk of granting test enabled permissions to a wireless device. Granting a test-enabled permission permits the device to execute test applications, independent of whether they have been certified to be run on a network. Because these applications may cause harm to the network, a certain amount of risk is associated with the execution of these applications. However, it is desireable that these applications be tested on a network. Consequently, the management function allows testing yet controls the risk of running uncertified applications by identifying the testing entity who receives the test enabled permission (i.e., their skill ability or trustworthiness can be assessed prior to giving them a test enabled permission. The testing entity, in essence, may be authenticated.); by tracking the test enabled permissions (i.e., keeping track who has the permission); by limiting the number of test enabled permissions that are distributed, including all distributed test enabled permissions and those given to a specific testing entity; and by providing an expiration time to the test enabled permission. Other functions may be used by the management function to aid in the controlling of risk associated with the test enabled permission.

It will also be recognized that while the description describes a test enabled permission for an application in a wireless device, the invention also applies to other devices, including wireline and independently connected devices. Allocating test enabled permissions allows an entity to control the testing of applications or other components on their software or hardware while controlling the risk associated with this testing.

In one embodiment, the management function uses the device's Electronic Serial Number ("ESN") to track the test enabled permission. The ESN is a unique code for all devices. However, other unique codes may be used.

Figure 8:
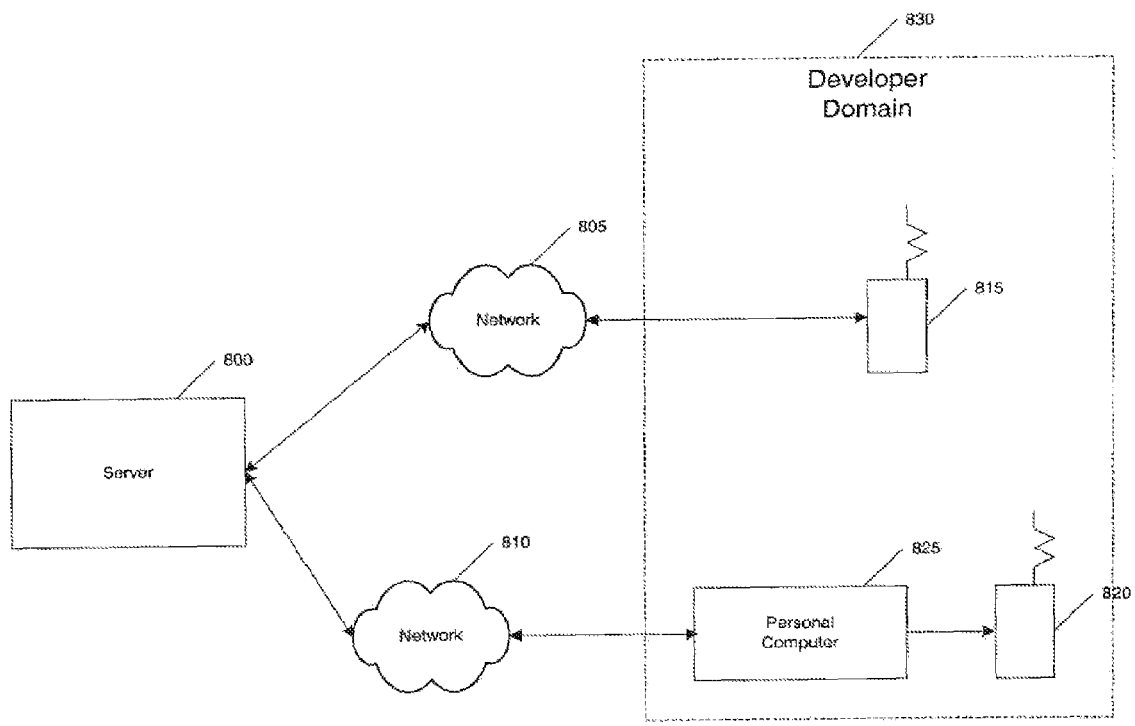
FIG. 8 depicts a system architecture in which an exemplary embodiment of the present invention may be implemented.

FIG. 8 depicts a system architecture in which an exemplary embodiment of the present invention may be implemented. The server 800 contains the management tracking function and the ability to assign a test enabled permission to a wireless device. The test enabled permission may be accessed by the wireless device 815 dialing into the server, making the request for the test enabled permission and receiving it back via the network 805. The network 805 may be a RF network similar to that described with respect to FIG. 3.

Alternatively, the developer may use a Personal Computer ("PC") 825 to access the server 800 via network 810. The network 810 may be similar to that described with respect to FIG. 3, a pure landline network such as the Internet, or a combination the two.

In one embodiment, the developer logs on to the server 800 website via a PC 825. The developer requests a test enable permission. In this embodiment, the developer enters an ESN for the device for which he or she wants to be test enabled.

If the test enabled permission is granted the developer receives the test enabled permission from the server 805. A modification detection technique, such as the use of digital signatures, may be used to detect modifications of the test enabled permission. If modifications are detected, the rules by which the permissions are evaluated may incorporate this condition, therefore causing the test enable condition not to be met, i.e., not allowing execution of the application based on the evaluation of test enabled permission and rule condition.

The developer may transfer the test enable permission, along with the digital signature and any other parameters, such as an expiration date also received from the server 800, to the wireless device 820. This transfer may occur via a direct connection to the PC.

It will be recognized that there may be many mechanisms to distribute the signature to the target device receiving the test enabled permission, including receiving it on a CD-ROM and downloading it onto the target device 815 or 820. There may be no interaction between the target device receiving the test enabled permission and the server 800 distributing the test enabled permission.

The wireless device 820 (and 815) may execute applications located on the wireless device because it is has the test enabled permission. Because of the information contained in the profile and the additional tracking performed on the test enabled permissions, even though a risk may occur that the application being tested on the wireless devices 815, 820 may cause some harm to the carrier network, because the risk may be acceptable to a carrier because it can limit the number of test enabled devices on their network, can designate whether they developer is allowed any test enabled permissions or not, therefore can allow more trusted developers to have test enabled permissions.

Figure 9:
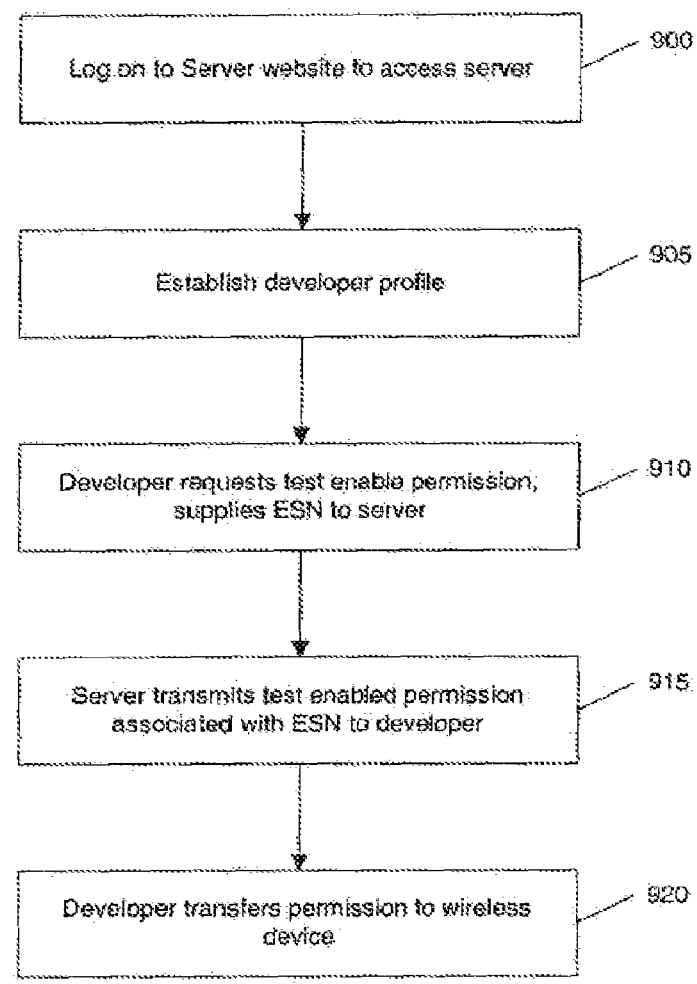
FIG. 9 is a flowchart depicting the process of receiving a test enabled permission in an exemplary embodiment of the present invention.

FIG. 9 is a flowchart depicting the process of receiving a test enabled permission in an exemplary embodiment of the present invention. A developer logs in to a server where the test enabled permission may be distributed (Step 900). The developer enters profile information (Step 905). This may include the type of developer, developer identification material, the types of applications the developer is intending to develop, the networks (i.e., carriers) the developer intends to implement the applications on, and ESNs associated with the developer. Other information may be inserted to further track the test enabled permissions and developers.

The developer places a request for a test enabled permission (Step 910). In one embodiment, the developer enters the unique code of the wireless device that he or she wants to use as a test device, such as the ESN of the wireless device.

The server will then determine whether the developer can receive the test enabled permission. The criteria the server may use include what carrier the ESN is associated with (this can be performed by looking up what carrier the ESN is associated with in a table at the server or received form other sources, such as the carrier or device manufacturer), how many test enabled permissions the carrier allows the developer to have, and has the developer attempted to exceed the number of test enabled permissions allocated to them.

If it is determined the developer is allowed a test enabled permission, the server then sends the test enabled permission associated with the ESN entered by the developer to the developer (Step 915). This test enabled permission is bound to the ESN and, consequently, will only allow applications to execute under the test enabled permission on wireless device associated with the ESN. If the same permission was moved to another wireless device, therefore having a separate ESN, the test enabled permission would not allow the application to run by satisfying the test enabled rule. (It will be recognized that other permissions may be granted satisfying other rules allowing an application to execute).

Furthermore, a digital signature may be created and sent along with the test enabled permission so that any modification of the test enabled permission can be determined.

In addition, in one embodiment of the present invention, an expiration date is sent to the developer associated with the test enabled permission. Once the expiration date is passed, the test enabled permission is no longer valid and the wireless device will not be able to use this permission to allow the execution of applications on the wireless device. Also, the digital signature may incorporate expiration date information.

If the developer is accessing the server via a PC, then the developer may then transfer the test enabled permission to the wireless device having the ESN (Step 920) previously submitted to the server.

The server management function keeps track of information from this procedure, including which ESN was assigned the test enabled permission, which developer it was assigned to, and the expiration date, if one exists, of the test enabled permission assigned.

Because the test enabled permission is associated with an ESN, and hence a wireless device, and not a specific application, in one embodiment, the wireless device having the ESN can execute many applications with the one test enabled permission.

Figure 10:
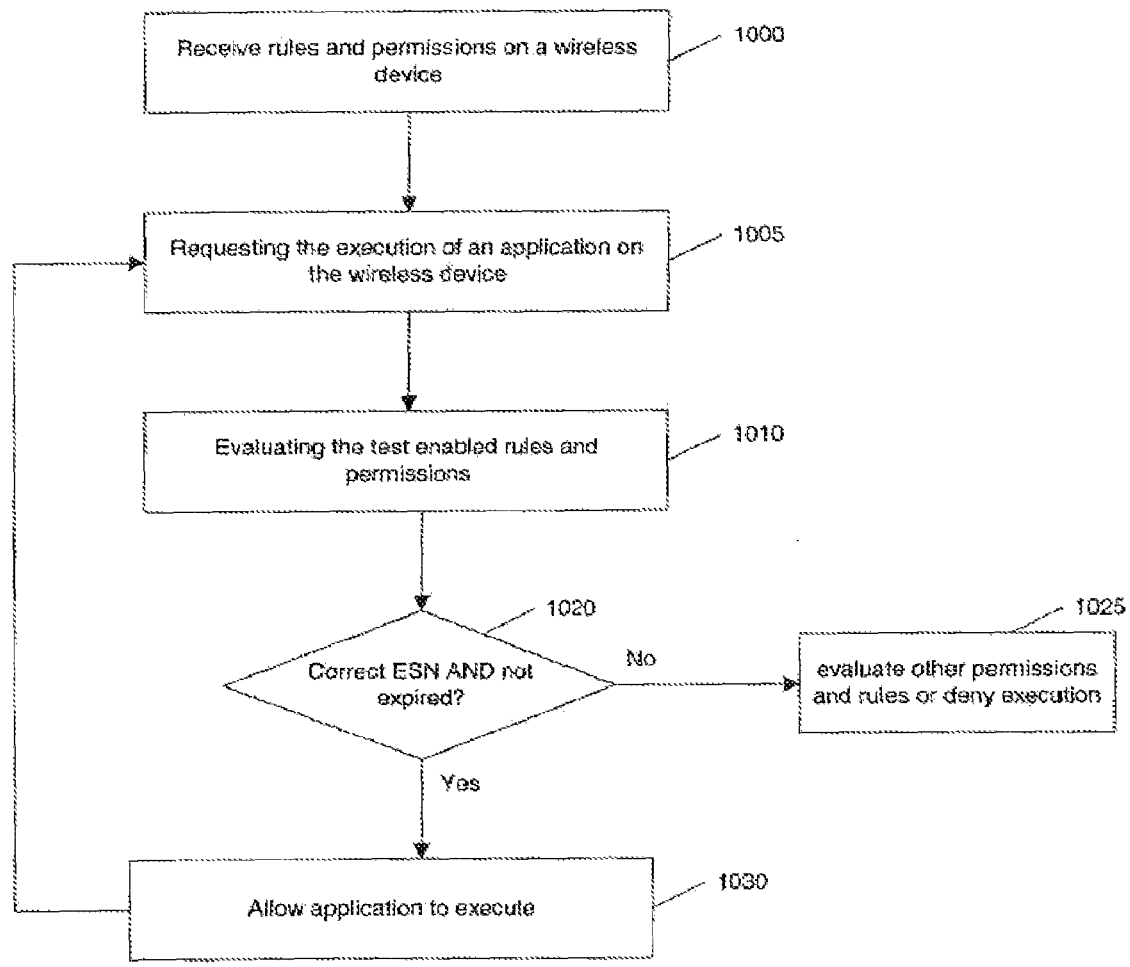
FIG. 10 shows the process of executing an application having a test-enabled permission stored on the wireless device in an exemplary embodiment of the present invention.

FIG. 10 shows the process of executing an application having a test enabled permission stored on the wireless device in an exemplary embodiment of the present invention. In one embodiment, the wireless device has a control program that requires some applications to be granted permission prior to being allowed to execute. For those applications executing in the control program platform, rules contained in the wireless device are evaluated with permissions for specific applications, or the test enabled permission discussed in FIGS. 8 and 9. When an application's execution is requested, the control program uses the rules and permissions contained in the wireless device to determine whether to allow execution of the application.

The process begins by receiving rules and permissions on a handset (Step 1000). Evaluation of a test enabled permission is performed in light of the rules contained in the wireless device. (The rules may also be subject to a digital signature or some other modification detection technique to determine whether the rules have been modified. A control program may be used to aid in this modification determination.) An example of rules associated with test enabled, certification, and carrier permissions are:

If (permission==Test Enabled and ESN match and Date Valid)
   run application
else (if (permission==Passed Certification)
   run application
else (if permission=Carrier and Carrier ID matches)
   run application
else
   fail This set of rules is a list of conditional statements. As shown in the first "if" statement, if a permission indicates that it is has been given the test enabled permission, the application will only run if the ESN associated with the test enabled permission is the same as the wireless device attempting to execute the application, and if the date is valid (i.e., the expiration date has not been exceeded). If these conditions are not met in this example, the execution of the application will not be allowed. (Note however, that the application may still execute if other conditions in the rules are satisfied, e.g., the application passed certification).

Continuing with FIG. 10, the process proceeds to request the execution of an application (Step 1010). The rules and permissions on the wireless device are evaluated to determine if the application is test enabled (Step 1015). If the ESN in the permission matches the ESN of the phone and the test enabled permission has not expired (Step 1020), then the application is allowed to execute (Step 1030).

If the wireless device attempting to execute the application has does not match the ESN in the permission or the expiration date has passed then the application is not allowed to execute (or alternatively, other rule conditions are evaluated to determine if the application may execute as described above) (Step 1025).

After Step 130, the process may proceed back to receiving a request to execute another application. Another application may be executed using these same test enabled permissions, note in this embodiment, the test enabled permission grants an application's execution not based on the application executing, but on whether it is test enabled device (the matching ESN) and expiration has not occurred). Therefore, several applications may be tested on the device by receiving the one test enabled permission from the server.

It will be recognized that additional conditions and permission parameters (e.g., developer ID, control program version, etc.) may be used and added to the rules' conditional statements to determine whether the test enabled permission satisfies the rules to allow execution of the application.

Conclusion

Systems and method consistent with the present invention provide safe and secure application distribution and execution and controls the risk of providing a test environment associated with the testing of applications. Test enabled permissions are created and distributed to selected application test entities. A management function is used to aid in distributing the test enabled permissions. The risk is controlled by providing closer scrutiny of the identity of the test entity prior to distributing a test enabled permission to the test entity, providing expiration times associated with the test enabled permissions, and limiting the number of test enabled permissions distributed. The management function tracks the distribution of the test enabled permissions.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

The invention claimed is:

1. A method for executing an application on a wireless device, comprising:
receiving, at the wireless device, a test permission that indicates the wireless device is authorized to execute the application on a wireless network in a testing capacity, the test permission being associated with the wireless device;
requesting the execution of the application on the wireless device;
evaluating whether the wireless device includes the test permission; and
if the wireless device includes the test permission, executing the application on the wireless device, wherein the application is executed on the wireless device even if the application includes other permissions necessary to execute the application on the wireless device or the wireless network.

2. The method of claim 1, wherein if the wireless device does not include the test permission, the method further comprises:
testing the application to ensure that the application satisfies requirements for an environment in which the application will execute;
verifying that the application is being executed on a permitted device and on a permitted wireless network; and
removing the application if the application performs an illegal or undesirable action.

3. The method of claim 1, further comprising, prior to receiving the test permission, requesting the test permission from an authorizing entity that manages test permissions.

4. The method of claim 3, wherein requesting the test permission further comprises submitting profile information about a developer entity on whose behalf the request is being made.

5. The method of claim 1, further comprising:
denying the executing of the application if the evaluation of the test permission indicates access is not allowed.

6. The method of claim 1, wherein evaluating whether the wireless device includes the test permission further includes:
comparing a unique identifier associated with the wireless device to information derived from the test permission to determine if the wireless device is authorized for the test permission.

7. The method of claim 1, wherein evaluating whether the wireless device includes the test permission farther includes evaluating a modification detection technique to verify the integrity of the test permission.

8. The method of claim 7, wherein the modification detection technique comprises a digital signature.

9. The method of claim 1, wherein the test permission is application independent.

10. A wireless device, comprising:
an input to receive a test permission that indicates the wireless device is authorized to execute an application on a wireless network in a testing capacity, the test permission being associated with the wireless device;
a storage to store the test permission and a unique identifier associated with the wireless device;
a control program configured to evaluate whether access to the application is authorized by evaluating the test permission and the unique identifier, the evaluation being independent of the application including other permissions necessary to access the application; and
if the access is authorized, accessing the application to:
test the application to ensure that the application satisfies requirements for an environment in which the application will execute, and
assign the other permissions to the application to control which devices or systems may execute the application.

11. The wireless device of claim 10, wherein the control program is further configured to access a second application by evaluating the test permission and the unique identifier.

12. The wireless device of claim 10, wherein the unique identifier is an electronic serial number ("ESN").

13. The wireless device of claim 10, wherein the control program is further configured to verify the integrity of the test permission by analyzing a modification detection technique associated with the test permission.

14. The wireless device of claim 13, wherein the modification detection technique comprises a digital signature.

15. A method for managing test permissions, comprising:
storing profile information related to an entity;
receiving a request by the entity for a test permission for a wireless device, the wireless device having a unique identifier, the test permission being operative to enable the wireless device to execute an application on the wireless device independent of the application including other permissions necessary to execute the application on the wireless device or a wireless network;
associating the test permission with the unique identifier for the wireless device and with the profile information related to the entity; and
transmitting the test permission to the wireless device.

16. The method of claim 15, wherein associating the test permission includes binding the test permission to an Electronic Serial Number (ESN) associated with the wireless device.

17. The method of claim 15, wherein the test permission is assigned based on an evaluation of the profile information related to the entity, the evaluation being conducted to assess a likelihood of risk to the wireless network caused by allowing the entity to test applications on the wireless network.

18. The method recited in claim 15, wherein the test permission is associated with a modification detection technique prior to being transmitted to the wireless device.

19. The method recited in claim 18, wherein the modification detection technique comprises a digital signature.

20. A system for accessing applications on a wireless device, comprising:
means for receiving, at the wireless device, a test permission that indicates the wireless device is authorized to execute the application on a wireless network in a testing capacity, the test permission being associated with the wireless device;
means for requesting the execution of the application on the wireless device;
means for evaluating whether the wireless device includes the test permission; and
if the wireless device includes the test permission, means for executing the application on the wireless device independent of the application including other permissions necessary to execute the application on the wireless device or the wireless network.

21. A computer-readable medium comprising instructions for accessing an application on a wireless device, which, when executed by a computer, causes the computer to perform operations, the instructions comprising:
at least one instruction for receiving, at the wireless device, a test permission that indicates the wireless device is authorized to execute the application on a wireless network in a testing capacity, the test permission being associated with the wireless device;
at least one instruction for requesting the execution of the application on the wireless device;
at least one instruction for evaluating whether the wireless device includes the test permission; and
if the wireless device includes the test permission, at least one instruction for executing the application on the wireless device independent of the application including other permissions necessary to execute the application on the wireless device or the wireless network.

* * * * *